No. 707,561. Patented Aug. 26, 1902.
M. E. DUNCAN.
CAN OPENER.
(Application filed May 1, 1901.)
(No Model.)
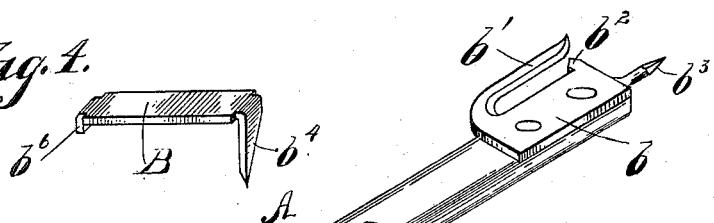
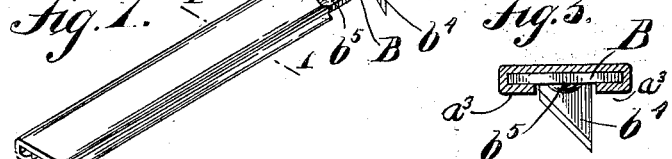
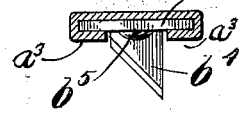
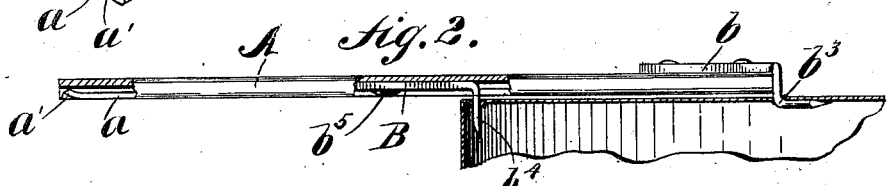
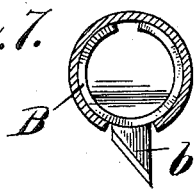
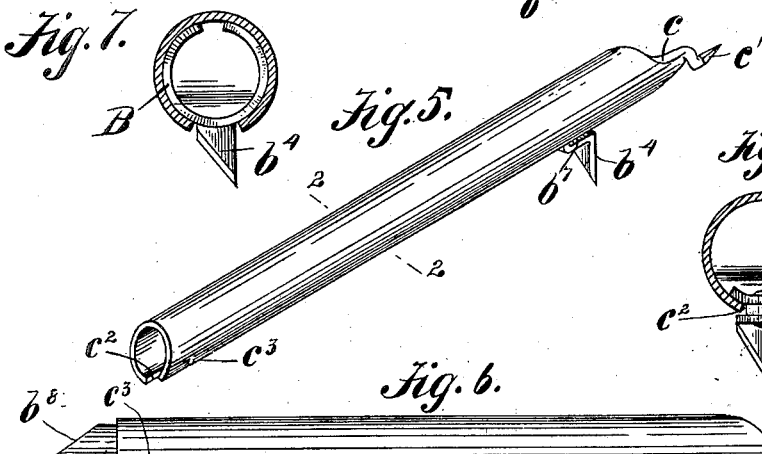
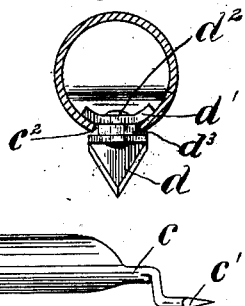
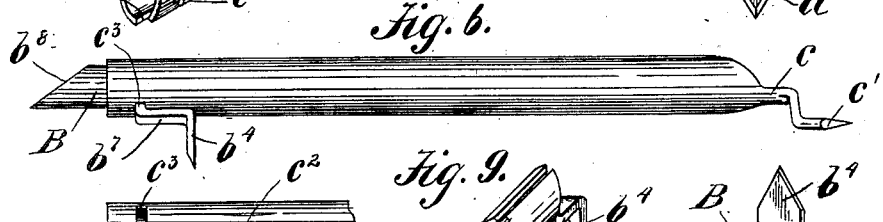
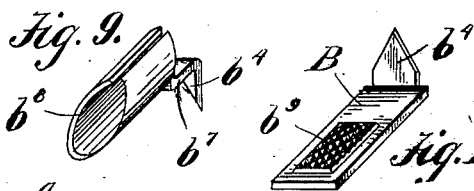
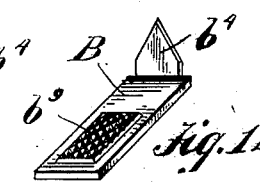
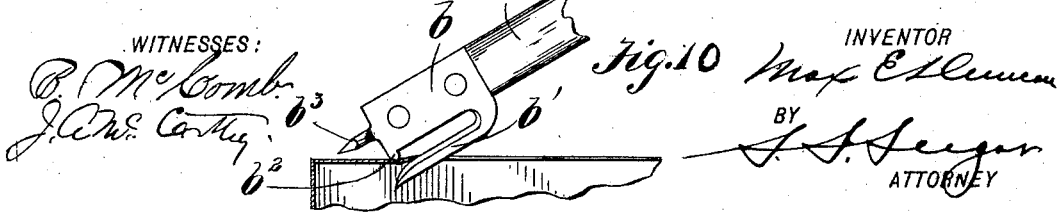
WITNESSES:
INVENTOR
BY
ATTORNEY

UNITED STATES PATENT OFFICE.

MAX E. DUNCAN, OF NEW YORK, N. Y., ASSIGNOR TO BYRON R. BACON, OF SOUTH ORANGE, NEW JERSEY.

CAN-OPENER.

SPECIFICATION forming part of Letters Patent No. 707,561, dated August 26, 1902.

Application filed May 1, 1901. Serial No. 58,236. (No model.)

*To all whom it may concern:*

Be it known that I, MAX E. DUNCAN, a citizen of the United States, and a resident of New York city, county of New York, and State of New York, have invented certain new and useful Improvements in Can-Openers, of which the following is a specification, reference being had to the accompanying drawings, forming a part thereof, in which similar letters of reference indicate corresponding parts.

My invention relates to improvements in can-openers, and has reference to that class of can-openers wherein a sliding blade moves along a shank or handle and wherein the shank has a piercing-point formed upon its end, the said piercing-point being adapted to act as a fulcrum or center around which the cutting-blade moves when cutting the can.

An essential feature of my device is the formation of the piercing-point upon and integral with the plate secured to the end of the shank, and which in turn is formed with a cutting-blade particularly adapted for cutting in a straight line.

The object of my invention is to provide a device of the nature described which, while being just as effective in operation as any device of a similar character heretofore made, has the particular advantages in construction which embody simplicity and cheapness, as will be hereinafter set forth. I attain this object by the device illustrated in the accompanying drawings, in which—

Figure 1 is a perspective view of my can-opener and shows a portion of the shank or handle broken away to better illustrate the position of the sliding blade. Fig. 2 is a side view, partly in section, and shows my device applied to a can. Fig. 3 is a sectional view through the line 1 1 of Fig. 1. Fig. 4 is a view of the cutting-blade. Fig. 5 is a perspective view showing a slight constructional modification. Fig. 6 is a side view of same and shows the sliding blade with an end projecting beyond the end of the shank. Fig. 7 is a section through the line 2 2 of Fig. 5. Fig. 8 is a bottom view of one end of the shank. Fig. 9 is a perspective view of the sliding blade used in the modified form. Fig. 10 shows the method of using the cutter formed upon the end of the shank. Fig. 11 is a cross-sectional view of the modified form of my device and shows the sliding blade made up of two plates securely fastened by rivets, and Fig. 12 is an inverted perspective view of a sliding blade having a roughened under surface and double-edged cutting-blade.

In practice I provide a hollow flat shank A, having its edges turned to form the ledges $a^3$ and the longitudinal slot or opening $a$ along its under side, and upon the end of which I secure the plate $b$, having a cutting-blade $b'$, a projecting point $b^2$, adapted to grip the tin when the said blade is used, and a piercing-point $b^3$, formed integrally with the plate. The sliding blade consists of a plate B, formed with a pointed depending blade $b^4$, and moves within the shank A. The said depending blade $b^4$ engages through the slot $a$. To facilitate the movement of the sliding blade along the shank by the finger, I form the plate B with a slight depression or knob $b^5$, upon which the finger of the operator engages to set the blade, or for the same purpose I may turn the edge of the plate B to form the flange $b^6$, as shown in Fig. 4. To prevent the sliding blade from slipping off of the shank, I slightly turn in the ends $a'$ of the flanges upon each side of the slot $a$.

To cut out the top of a can, I insert the piercing-point $b^3$ through the center of the can and force the depending blade $b^4$ through the can near its end, as shown in Fig. 2. By drawing the shank or handle A around, the top is very readily cut away.

The blade $b'$ is particularly adapted for cutting in a straight line and is used in the manner illustrated in Fig. 10. I first perforate the top with the piercing-point $b^3$, and, withdrawing same, I insert the blade in the opening formed, and by moving the shank up and down and giving the cutter a slight forward pressure the can is very easily cut. The projecting point $b^2$ acts to grip the tin every time the shank is raised and prevents the blade from slipping.

In the modified form shown in Fig. 5 I form the shank cylindrically instead of flat and bring the two sides together at $c$ and form the piercing-point $c'$ integral with the shank. The cutting-blade $b^4$ in this form extends longitudinally away from the plate, as at $b^7$, and the said plate is made circular in section to conform with the shape of the shank in which it moves. The end $b^8$ of the plate is beveled and has a sharp cutting edge and is particularly designed for cutting out small circular holes. To prevent the plate from slipping, I form an offset $c^3$ near the end of the slot $c^2$, in which the portion of the blade nearest the plate is adapted to engage while the beveled knife-edge $b^8$ of the plate is being used.

In Fig. 11 I show a double-edged cutting-blade $d$, suitably secured to a plate $d'$ by means of the rivets $d^2$. A second plate or washer $d^3$ may be interposed between the plate $d^2$ and knife $d$ and engage through the slot $c^2$.

By forming the blade $d$ with a cutting edge upon each side I provide a device with which a can may be cut by moving the shank in either direction at the will of the operator; but this feature is not an important one, as a knife having a single cutting edge will answer all purposes.

Fig. 12 illustrates a cutting-blade $b^4$, double-edged, and plate B, which is provided with a roughened surface $b^9$, that may be substituted for the depression $b^5$ or turned edge $b^6$. (Shown in Figs. 3 and 4.)

Having thus described my invention, what I claim as new, and desire to secure by Letters Patent, is—

In a can-opener comprising a shank, ledges formed by the turned-over edges of said shank, a cutting-blade formed upon a plate and attached to the end of said shank and a piercing-point formed integrally upon said plate, in combination with a sliding cutting-blade adapted to move along said shank and held upon same by means of the aforesaid ledges or turned edges, substantially as described.

In testimony that I claim the foregoing as my invention I have signed my name, in presence of two witnesses, this 20th day of April, 1901.

MAX E. DUNCAN.

Witnesses:
   S. S. SUGAR,
   B. McCOMB.